United States Patent
Adusumilli

(10) Patent No.: US 7,971,024 B2
(45) Date of Patent: *Jun. 28, 2011

(54) OFF-CHIP MICRO CONTROL AND INTERFACE IN A MULTICHIP INTEGRATED MEMORY SYSTEM

(75) Inventor: Vijay P. Adusumilli, San Jose, CA (US)

(73) Assignee: Atmel Corporation, San Jose, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 12/351,707

(22) Filed: Jan. 9, 2009

(65) Prior Publication Data

US 2009/0287896 A1    Nov. 19, 2009

Related U.S. Application Data

(62) Division of application No. 11/393,549, filed on Mar. 29, 2006, now Pat. No. 7,478,213.

(51) Int. Cl.
*G06F 12/08* (2006.01)
(52) U.S. Cl. .......................... 711/171; 711/114; 711/170
(58) Field of Classification Search .............. 711/5, 103, 711/166, 167; 365/63, 185.05, 185.11, 233
See application file for complete search history.

(56) References Cited

U.S. PATENT DOCUMENTS

| | | | |
|---|---|---|---|
| 4,731,737 A | 3/1988 | Witt et al. | |
| 5,003,465 A | 3/1991 | Chisholm et al. | |
| 6,421,757 B1 * | 7/2002 | Wang et al. | 711/103 |
| 6,567,335 B1 | 5/2003 | Norman et al. | |
| 7,317,630 B2 * | 1/2008 | Telecco et al. | 365/63 |
| 7,478,213 B2 | 1/2009 | Adusumilli | |
| 2004/0246759 A1 * | 12/2004 | Miyazaki | 365/120 |
| 2006/0085589 A1 | 4/2006 | Roohparvar | |
| 2007/0233988 A1 | 10/2007 | Adusumilli | |
| 2008/0016269 A1 * | 1/2008 | Chow et al. | 711/103 |
| 2008/0028134 A1 | 1/2008 | Matsubara et al. | |

OTHER PUBLICATIONS

"U.S. Appl. No. 11/393,549, Examiner Interview Summary mailed Apr. 18, 2008", 2 pgs.
"U.S. Appl. No. 11/393,549, Notice of Allowance mailed Sep. 4, 2008", 8 pgs.
"U.S. Appl. No. 11/393,549, Response filed Jun. 18, 2008 to Restriction Requirement mailed Apr. 18, 2008", 8 pgs.
"U.S. Appl. No. 11/393,549, Restriction Requirement mailed Apr. 18, 2008", 6 pgs.

* cited by examiner

*Primary Examiner* — Jack A Lane
(74) *Attorney, Agent, or Firm* — Fish & Richardson P.C.

(57) ABSTRACT

A communication interface, coupling a controller device to one or more memory devices, provides a high-voltage reset interface. The high-voltage reset interface provides a high-voltage signal to reset the one or more memory devices. The high-voltage reset interface is implemented using a single interconnect line. The reset voltage signal is greater than a maximum voltage representing a high logic value. The communication interface may also include a bi-directional data and address interface that is used to send address, data, and commands between the controller device and the one or more memory devices. A method of transferring information between the controller device and the one or more non-volatile memory devices includes resetting the one or more non-volatile memory devices by asserting a high-voltage signal on the high-voltage reset interface and sending a command from the controller device to the one or more non-volatile memory devices via the data and address interface.

13 Claims, 5 Drawing Sheets

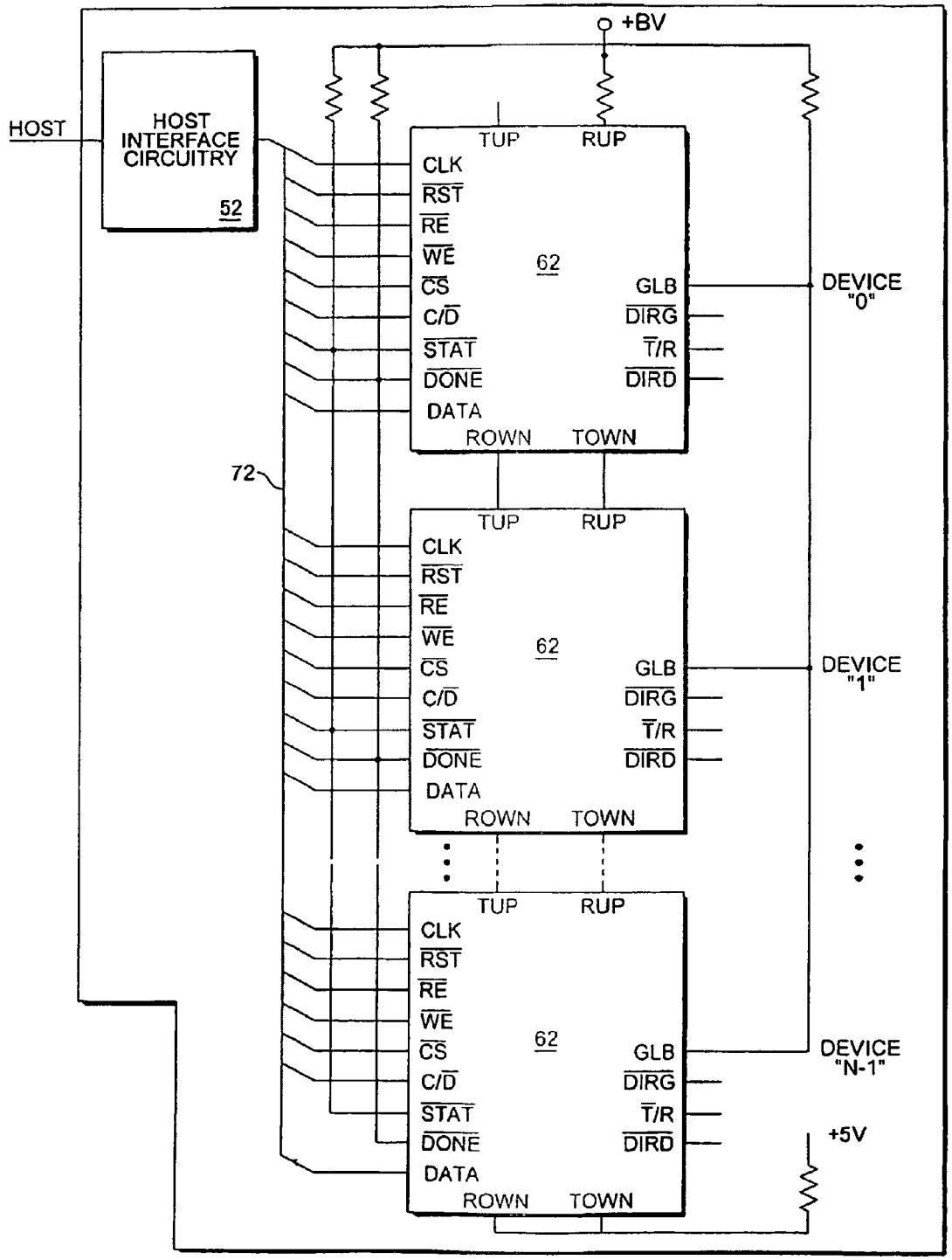
Fig._ 1 (Prior Art)

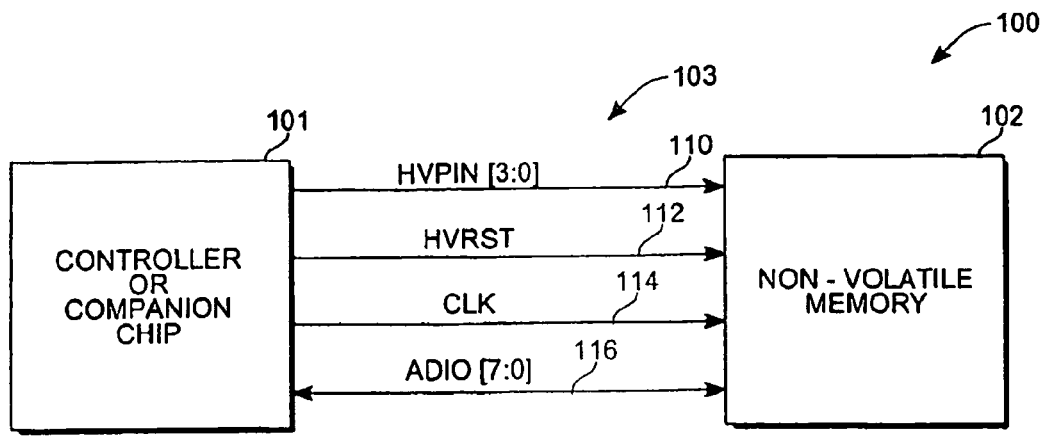
Fig._2A
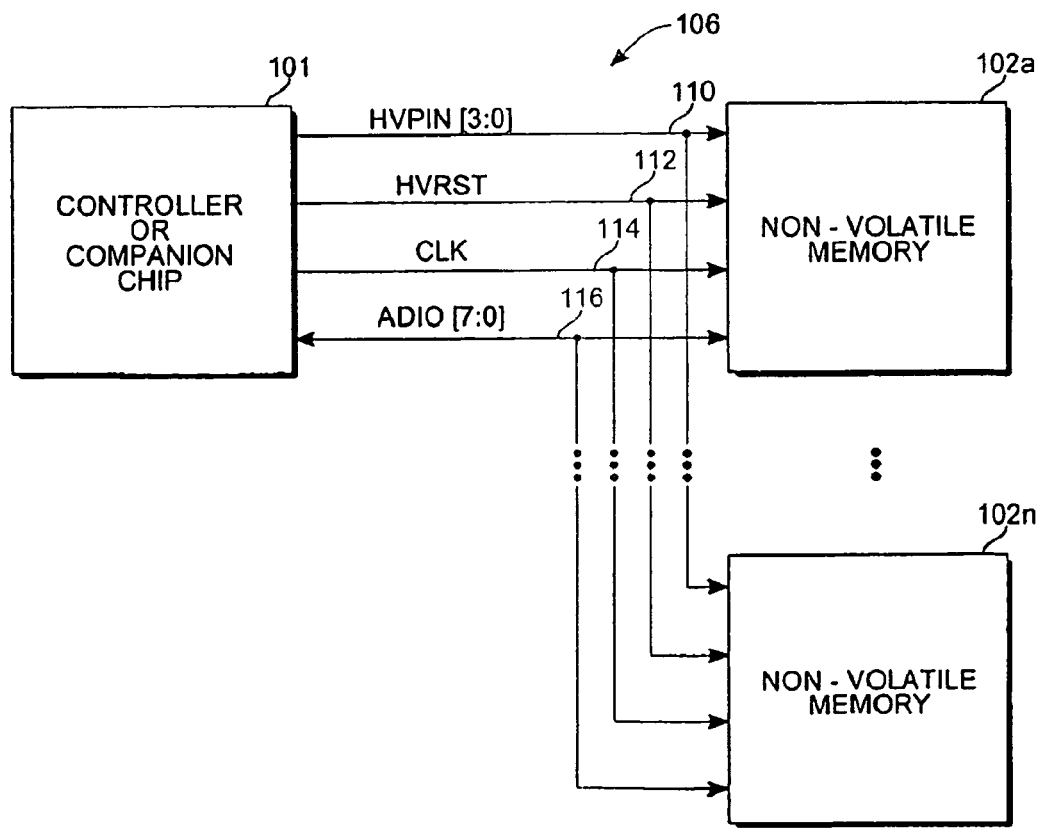
Fig._2B

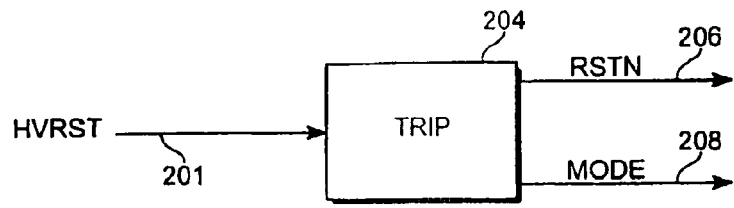
Fig._3A
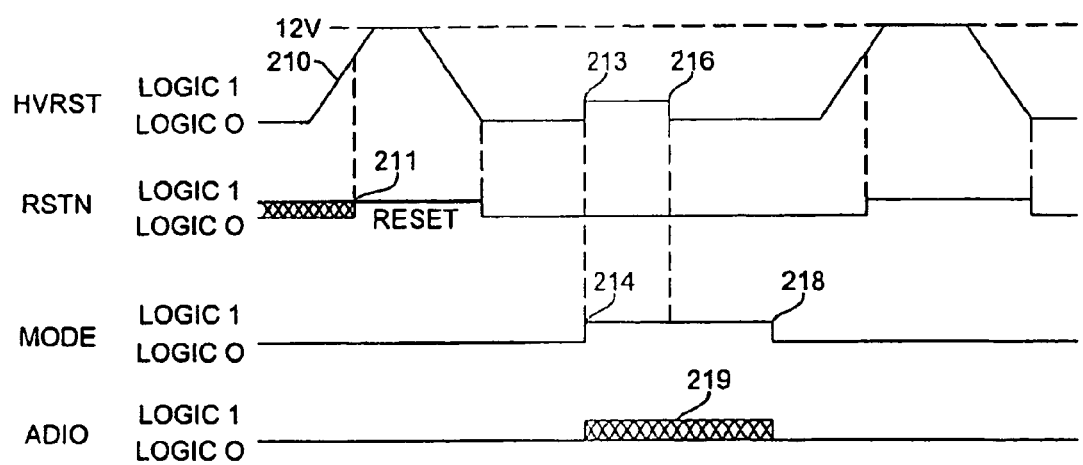
Fig._3B

OFF-CHIP MICRO CONTROL AND INTERFACE IN A MULTICHIP INTEGRATED MEMORY SYSTEM

RELATED APPLICATIONS

This application is a divisional of U.S. patent application Ser. No. 11/393,549, filed on Mar. 29, 2006, now U.S. Pat. No. 7,478,213 which is incorporated herein by reference in its entirety.

TECHNICAL FIELD

The present invention relates generally to memory systems, and more particularly to an interface between a memory controller or microcontroller and a device containing a non-volatile memory array.

BACKGROUND

Memory storage capacities of EEPROM and flash memories are being made larger to meet increasing memory requirements. Typically, EEPROM and flash memory devices are available in a single chip or single package configuration. The typical memory device integrated circuit package contains a memory array, a memory controller or microcontroller, and other circuits to, for example, address, program, and erase memory cells within the memory array.

Communications between a computer system and memory elements associated with the computer system are typically performed using a standardized communication bus. For example, when EEPROM or flash memories are used as an onboard ROM device an industry standard high speed communication bus is typically used. When EEPROM or flash memories are used as a portable storage device for a computer system, a communication bus such as a USB is used. In an additional example, when EEPROM or flash memories are used to store audio files, graphics, pictures, and video for a still camera, video camera, or portable audio device, a variety of standardized interfaces are associated with the user device.

Referring to FIG. 1, a typical prior art scheme for interfacing a memory device to a host interface is shown, as described in U.S. Pat. No. 4,731,737 by Witt et al. entitled "High Speed Intelligent Distributed Control Memory System." A host interface circuit 52 is coupled to a plurality of memory devices 62. An interface 72 includes a clock signal line, a reset line, a read enable line, a write enable line, a chip select line, a status line, a done line and a data interface.

Each memory element in the memory array described by Witt is capable of transferring data between adjacent memory elements during a read operation or during a write operation. However, Witt does not address specific needs for certain memory structures where it is desirable to reduce or minimize control logic or control circuits contained within the memory device chip and minimize a number of pins read by the host interface circuit 52. Also, Witt does not address special needs or signaling that may be advantageous when using nonvolatile memory devices or memory devices other than RAM memory.

BRIEF DESCRIPTION OF THE DRAWINGS

FIG. 1 is a prior art block diagram of memory devices and a host interface circuit.

FIG. 2A is a block diagram of an exemplary interface between a non-volatile memory device and a companion chip or controller chip.

FIG. 2B is a block diagram of an exemplary interface between a plurality of non-volatile memory devices and a companion chip or controller chip.

FIG. 3A is a block diagram of an exemplary high voltage interface circuit which works cooperatively with the non-volatile memory device shown in FIG. 2A.

FIG. 3B is a signal diagram of a high voltage reset operation for the interface shown in FIG. 2A.

SUMMARY

Figure 4:
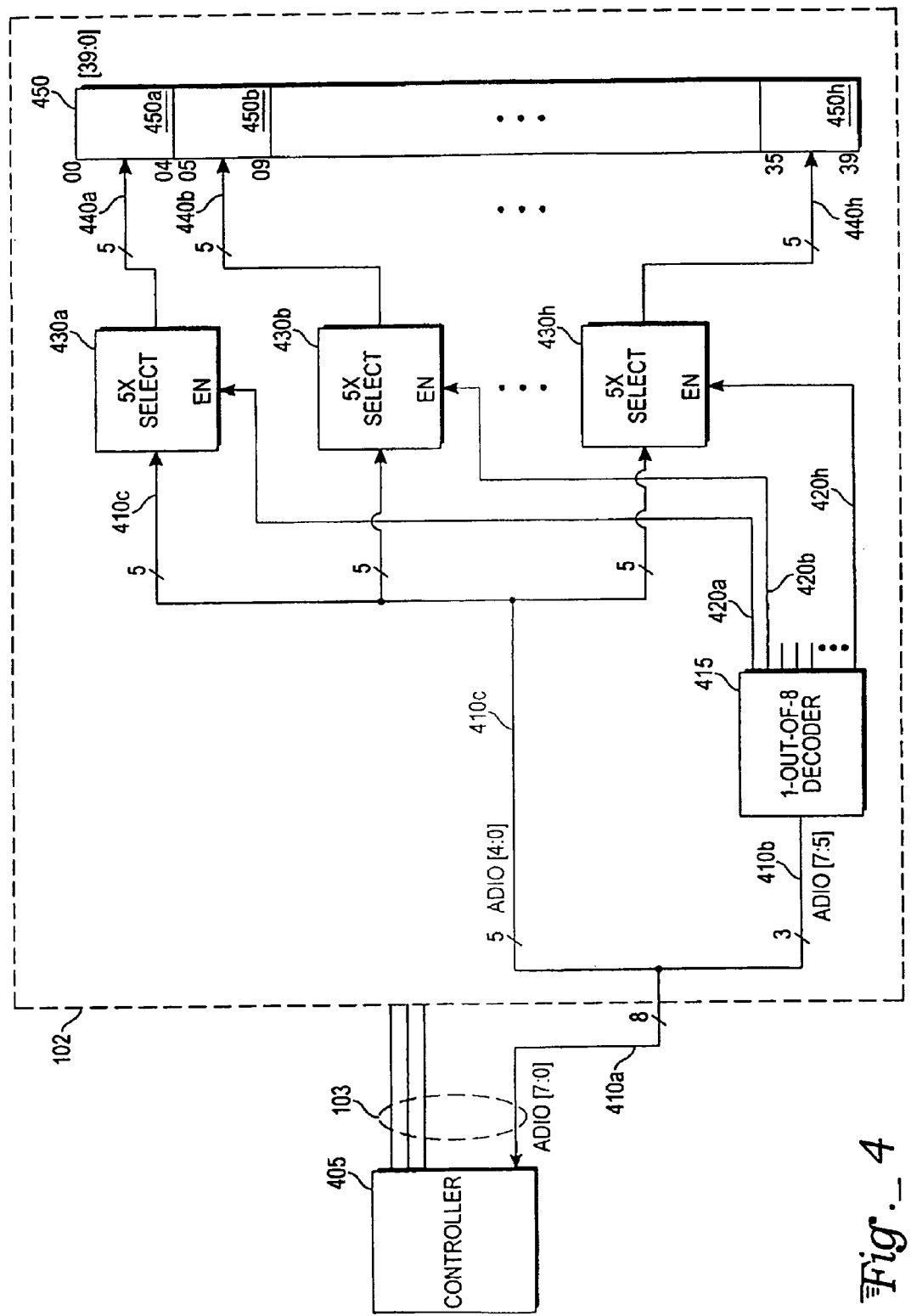
FIG. 4 is a block diagram of an exemplary microcontrol interface portion of the high voltage interface circuit of FIG. 2A.

An exemplary communication interface between a controller device and at least one non-volatile memory device is described. The communication interface includes a high voltage reset interface to provide a high voltage signal as a reset indicator. The communication interface may also include a clock interface to provide timing information, and command, data, and address interface to carry operation commands, data, and address information between the controller device and at least one nonvolatile memory device.

DETAILED DESCRIPTION

Flash and EEPROM devices require control circuitry to perform read, erase, and program operations. Considering market requirements for increasing memory size, layout, die size, and packaging, it is more efficient to implement a majority of the memory control circuits in a separate companion or control chip and to minimize the required control logic within a separate memory chip. To maintain packaging and layout efficiency, a restriction on the number of signals coupling the control chip to the memory chip is required. Extra pins on either the control chip or the memory chip increase the cost to manufacture each chip. However, the interface between the control chip and the memory chip must be robust, have a fast data throughput, and be scalable.

With reference to FIGS. 2A and 2B, in a non-volatile memory system 100, an exemplary communication or memory control interface 103 provides required control or signaling functions between a controller 101 (or companion chip) and a memory device 102. The controller 101 may be a microcontroller, a state machine, or other circuit that is configured to interface with the single memory device 102 or to interface with multiple memory devices (discussed infra). The controller 101 provides an external interface (not shown), for example to a computer, and controls various operations performed or interacting with the memory device 102. The memory device 102 is generally a non-volatile memory array, such as a 256 Mbit flash memory or EEPROM device, that includes circuitry or logic to support the memory control interface 103.

The memory control interface 103 pin-out or interface lines and protocol may include the following: a high voltage interface 110 (HVPIN) to provide high voltage control signals to the memory array or memory device 102, a (high voltage) reset interface 112 (HVRST) to provide reset information to the memory device 102, a clock interface 114 (CLK) to provide timing information to the memory device 102, and a address, data, and command interface (ADIO [7:0]) 116 to provide bidirectional command, data, and address information between the controller 101 and the memory device 102. The memory control interface 103 may also optionally include a pin-out or at least one interface line used to specify, select, or activate an individual or target memory device (not shown). A clocking or timing signal presented on the clock interface 114 is generally implemented using a single interface line and is typically generated by the controller 101.

In a specific embodiment of the memory control interface 103, the high voltage interface 110 includes four high-voltage pins or signal lines to control various operations of the memory array (not shown) within the memory device 102. Signaling information presented on the high voltage interface 103 is generally generated and controlled by the controller 101.

The address, data, and command interface 116 includes eight bidirectional multiplexed address/data pins or signal lines to exchange commands, memory array address information, and memory array data. The address, data, and command interface 116 may also be used to reset the memory device 102, to send commands, or to change operating modes of either the controller 101 or the memory device 102. The controller 101 may send a command to the memory device 102 that changes the mode of the address, data, and command interface 116. For example, if the controller 101 signals the memory device 102 that the address, data, and command interface 116 will be operating in a unidirectional mode, the controller 101 sends an address to the memory device 102, thereby suspending the memory device 102 from sending to the controller 101 during the send address operation. Also, the address, data, and command interface 116 may multiplex any commands, addresses information, or data information on the address, data, and command interface 116 lines.

The high voltage reset interface 112 (HVRST) is implemented on a single interconnect line, and is used to reset the memory device 102 by applying a high-voltage that is greater than the voltage of a high logic value or the voltage representing a "one" logic value. The high-voltage for either the high voltage reset interface 112 (HVRST) or the high voltage interface 110 (HVPIN) may be generated by a circuit (not shown) external to the controller 101 and memory device 102, or may be generated by the controller 101. The memory device 102 may also latch the high-voltage reset signal. The high voltage reset interface 112 is a command or mode enable indicator when signaling is used in the range of 1.8 V to 0 V.

The high voltage reset interface 112 may also be used to transmit standard logic signals. For example, the high voltage reset interface 112 may be used as a signal line to indicate to the memory device 102 to operate in a pre-selected mode of operation. The direction of the signaling on the address, data, and command interface 116 pins or lines may be determined by the pre-selected mode of operation. The direction of signaling on the address, data, and command interface 116 pins or lines may also be determined by sending a command from the controller 101 to the memory device 102 via the address, data, and command interface 116.

With reference to FIG. 2B, an exemplary memory control interface 106 provides required control or signaling functions between a controller 101 (or companion chip) and a plurality of memory devices $102_a$-$102_n$. The controller 101, high voltage interface 110, high voltage reset interface 112, a clock interface 114 (CLK), and the address, data, and command interface 116 all function as described supra. The signal lines of the memory control interface 106 are routed in parallel to support the plurality of memory devices $102_a$-$102_n$.

Referring to FIGS. 3A and 3B, an exemplary reset operation is performed. A high voltage reset interface line 201 (HVRST) (same or similar to the high voltage reset interface 112 in FIG. 2A) is driven to a high voltage 210, for example to 12 Volts, by the controller 101. The high voltage reset interface (HVRST) line 201 is driven to a voltage that is above a minimum threshold to differentiate the high voltage reset signal from a high logic value, for example, 0.7 Volts higher, or approximately 1 Volt higher than a high logic voltage level, when using transistor logic circuits. The high voltage interface (HVRST) line 201 is coupled to a trip circuit 204 within the memory device 102. The trip circuit 204 drives a high-voltage reset indicator (RSTN) line 206 within the memory device 102 to a reset logic value 211 to indicate that a reset event has occurred on the high voltage reset interface (HVRST) line 201. The reset logic value may be a logic one or a logic zero value (inverted). The trip circuit 204 optionally latches the reset logic value.

The trip circuit 204 also includes a mode indicator line 208 that may latch or pass through a standard logic (voltage) level signal that is presented on the high voltage reset interface 112. The signal on the mode indicator line 208 follows or indicates 214 the logic level present 213 on the high voltage interface line 201. For example, if a high logic signal 213 is presented on the high voltage interface line 201, the logic signal is detected and presented 214 on the mode indicator line 208. In one embodiment, the trip circuit 204 latches the logic value present on the mode indicator line 208. When the high logic signal presented on the high voltage interface line 201 transitions 216 to a low logic signal, the state of the logic signal may be latched for a predetermined time interval by the trip circuit 204 until the mode indicator line 208 transitions 218 to a low logic signal. For example, where command, data, or address information is being transferred from the controller 101 to the memory device 102, and a unidirectional communication mode is desired on the address, data, and command interface 116 during the transmission period 219 of the command, data, or address information. In an alternate embodiment, the trip circuit 204 does not latch the logic signal present on the high voltage reset interface line 201 and the unlatched mode indicator line 208 directly passes the logic value present on the high voltage reset interface line 201.

After a reset operation has been performed and the mode indicator has been asserted, a command is sent from the controller 101 to the memory device 102. A command is sent using the address, data, and command interface 116, for example, a single command may be sent using eight address, data, and command interface 116 lines in one clock cycle. Alternatively, other equivalent embodiments may be used, for example an 8-bit command may be sent over four address, data, and command interface 116 lines in two clock cycles. The address, data, and command interface 116 lines are bi-directional and signals or communication may be generated by either the controller device or by the memory device. During a command sending mode, the address, data, and command interface 116 lines are used to communicate from the controller 101 to the memory device 102. After the command has been sent, the communication direction of the address, data, and command interface 116 lines may change based on the just prior command sent.

Table 1 includes a listing of exemplary command functions, the exemplary control codes or operational codes, the effect on the address, data, and command interface 116 and general comments about each function or control code. For example, an erase operation has no effect on the address, data, and command interface 116 with regard to the communication direction or the signaling provided on the address, data, and command interface 116.

TABLE 1

| Control [7:0] | ADIO [7:0] | Function | Comments |
|---|---|---|---|
| 8'b0000_0000 | | Idle | Idle mode |
| 8'b0000_0001 | IO pads are configured as input | Initmode | Required fuses are loaded into the latches in this mode (fuses can be configuration latches) |
| 8'b0010_0000 | — | Read | Sets the global Read signal and indicates a start of 'Read' operation; 1 cycle |
| 8'b0100_0000 | — | Progm | Sets the global Program signal and indicates a start of 'Program' operation; 1 cycle |
| 8'b1000_0000 | — | Erase | Sets the global Erase signal and indicates a start of 'Erase' operation; 1 cycle |
| 8'bLLLL_1000 | | Mctrl | Micro control signals required during Read, Erase, and Program operations |
| 8'b0000_0111 | IO pads are configured as input | DataIN | Data Input mode done after program cmd and input address |
| 8'b0000_1011 | IO pads are configured as output mode | DataOut | Data output mode after Read/Mctrl |
| 8'b0000_1111 | IO pads are configured as input | AddIN | Input address in this mode is latched |

With reference to FIG. 4 and in continuing reference to FIG. 2A, a controller 405 is connected to the memory device 102 through the memory control interface 103. The eight lines of the address, data, and command interface (ADIO [7:0]) 410a are segregated into group code lines (ADIO [7:5]) 410b composed of three high-order bit positions and control data lines (ADIO [4:0]) 410c composed of five low-order bit positions. The group code lines 410b connect to the input pins of a 1-out-of-8 decoder 415. The control data lines 410c connect in parallel to input pins of each of eight 5X selectors 430a, 430b, . . . 430h.

From the output pins of the 1-out-of-8 decoder 415, each one of the eight 1-out-of-8 select lines 420a, 420b, . . . 420h connect respectively to an enable input pin EN of a corresponding one of the 5X selectors 430a, 430b, . . . 430h. Each of the 5X selectors 430a, 430b, . . . 430h produces five output lines forming one of eight control-data-line groups 440a, 440b, . . . 440h. Each one of the control-data-line groups 440a, 440b, . . . 440h connects to a corresponding one of eight control groups 450a, 450b, . . . 450h within a control register 450. Each of the control groups 450a, 450b, . . . 450h spans a range of five bit positions. A low order control group 450a spans bit positions [4:0], six intermediate control groups span bit positions [34:5], and a high order control group 450h spans bit positions [39:35] for a total of 40 bit positions in the control register 450 spanning positions [39:0].

In a micro control mode (corresponding to the Mctrl function describes supra), a group code, carried by the group code lines 410b, is decoded to provide a selection signal (not shown) on one of the 1-out-of-8 select lines 420a, 420b, . . . 420h. The selection signal is propagated by the selected one of the 1-out-of-8 select lines 420a, 420b, . . . 420h to the enable input pin EN of the corresponding one of the 5X selectors 430a, 430b, . . . 430h.

A set of control data (exemplified infra) on the control data lines 410c is enabled for propagation to the corresponding one of the control groups 450a, 450b, . . . 450h by the selection signal. The selection signal, applied to the selected one of the 5X selectors 430a, 430b, . . . 430h, enables propagation of the control data through the one of the control-data-line groups 440a, 440b, . . . 440h coming from the selected 5X selector. In this way the control data is propagated to one of the control groups 450a, 450b, . . . 450h with a corresponding group code. By cycling through a sequence of group codes and supplying a corresponding set of control data for each group code, a complete control word is assembled in the control register 450.

Table 2 correlates the group codes 410b and exemplary control data received in a corresponding one of the control groups 450a, 450b, . . . 450h.

TABLE 2

| Bit Positions | | | | | | | | | |
|---|---|---|---|---|---|---|---|---|---|
| [7] | [6] | [5] | [4] | [3] | [2] | [1] | [0] | FIG. 4 Labels | |
| Group Code | | | Control Data | | | | | Control Group | |
| 0 | 0 | 0 | 1 | 1 | 1 | 1 | 1 | 450a | |
| 0 | 0 | 1 | 1 | 0 | 1 | 0 | 1 | 450b | |
| . . . | . . . | . . . | . . . | . . . | . . . | . . . | . . . | . . . | |
| 1 | 1 | 1 | 0 | 1 | 0 | 0 | 0 | 450h | |

With all code entries, other than those listed above, having a control data value of 00000, a control word is formed in the control register 450 of value: [39:0] 01000_00000_00000_ 00000_00000_00000_10101_11111

In system operation, a group code value is decoded in one clock cycle and the control data is latched in the respective control group of the control register 450 in a second cycle. For eight control groups 16 clock cycles are required to load a 40 bit control word. The 40 bits of the control word are used to perform all essential programming and reading operations within the memory device 102.

Figure 5:
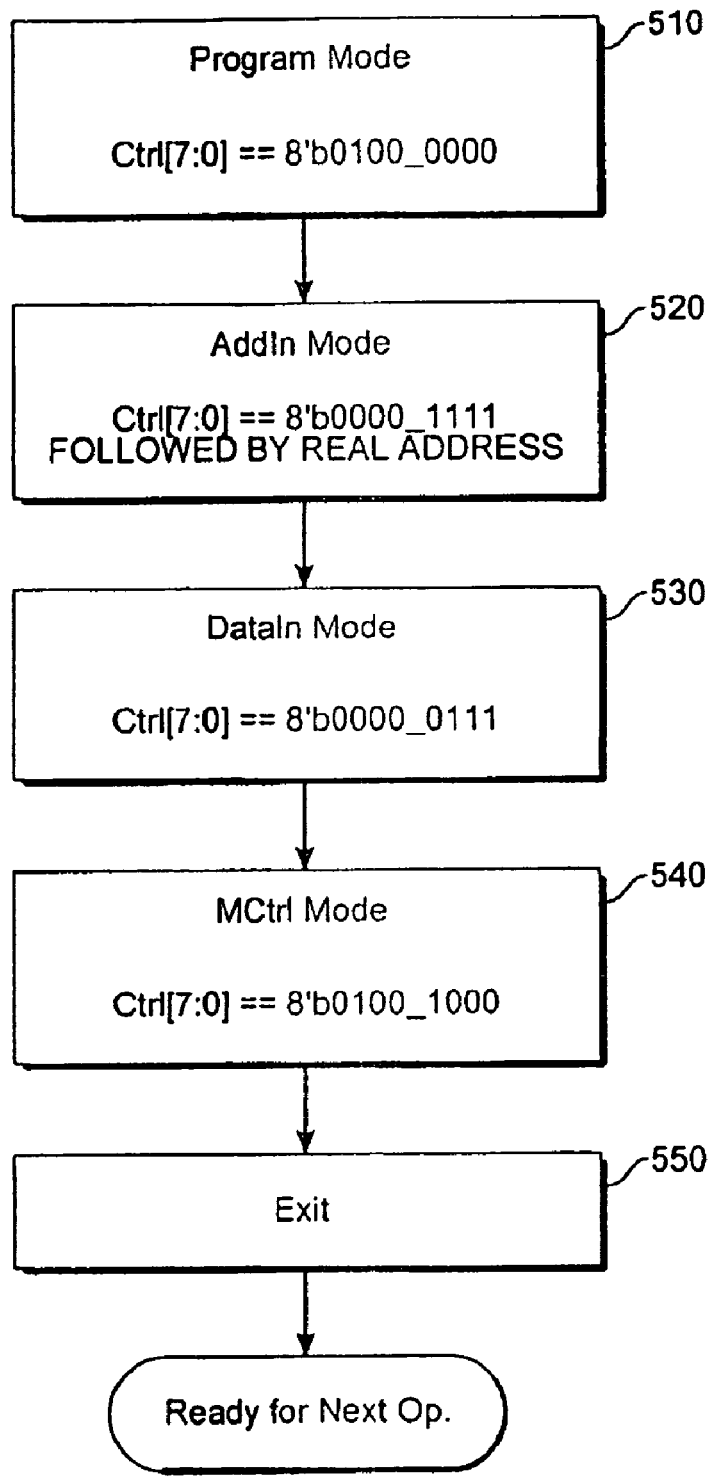
FIG. 5 is a flow chart of an exemplary program operation for the interface shown in FIG. 2A.

Referring to FIG. 5 and with reference again to FIG. 2A and FIG. 4, a flowchart for an exemplary program operation begins with the submission of a program operation or control code being transmitted on the address, data, and command interface 116 by the controller 101. The controller 101 initially instructs 410 the memory device to operate in an operational mode to program a selected memory cell or selected range of memory cells within the memory device 102. During this first step, global signals may be set within the memory device 102 or a general reset operation may also be performed within the memory device. Next, the controller 101 instructs 420 the memory device 102 to operate in an incoming address mode (AddIn) where, for example, the command is followed by a specific address or address range for a predetermined number of clock cycles. In a specific example, an incoming address mode command is sent to the memory device 102 followed by a specific 32-bit address over a period of four clock cycles where eight interface lines are used to implement the address, data, and command interface 116. Generally, when the memory device 102 is operating in an incoming address mode, the complete address or address range will be latched by the memory device 102 or where memory device 102 column and row address registers are loaded.

After the memory device 102 has latched the address, the controller 101 instructs 430 the memory device 102 to operate in an incoming data mode (DataIn). The incoming data mode command is followed by the specific data bytes that are to be loaded or programmed into the memory array of the memory device 102. The specific data are then programmed or stored in the memory device 102 at the address or location specified during the program operation.

Optionally, the controller 101 may instruct 440 the memory device 102 to operate in a mode enabling the memory device 102 to receive micro control signals. The micro control mode of operation allows the controller 101 to control portions of the memory array or other portions of the memory device 102, for example, an internal sense amplifier. During the micro control mode of operation, the controller 101 may also request a variety of status indicators if required. Status indicators vary depending on the particular instruction. For example, in this case of a program operation, the controller 101 may request how many internal programming cycles have been performed.

After a program or other operation has been completed, the single operational mode is exited 450 and the memory device 102 and the controller 101 are ready to implement the next operation. At exit 450, the controller 101 or the memory device 102 may automatically initiate an internal reset command. Alternatively, a reset is made part of a soft reset in a microcontrol operation.

Presented in this description are exemplary circuits and methods to implement an interface between a controller and a memory device. Those of skill in the art will recognize that the exemplary circuits and methods presented can be practiced with modification and alteration within the spirit and scope of the appended claims. Also, other embodiments will be apparent to those of skill in the art upon reading and understanding the above description. Another example for data and address signaling and interfaces may be an alternative multiplexed or serial data and address interface that may be used. The specification and drawings are therefore to be regarded in an illustrative rather than a restrictive sense.

What is claimed is:

1. A computer memory system comprising:
    a controller capable of producing memory control data by providing reset, mode, address, data, and command information;
    an interface coupled to the controller and capable of propagating the address, data, and command information in a single input-output data bus and propagating the reset and mode information on a single line;
    one or more memory devices coupled to the interface and each one capable of managing data storage by receiving the memory control data;
    a reset circuit within each of the one or more memory devices, the reset circuit coupled to the interface and configured to produce either a reset signal or a mode assertion signal;
    a decoder within each of the one or more memory devices, the decoder coupled to the interface and configured to receive the address, data, and command information over the single input-output data bus;
    wherein the decoder is ca able of decoding command information that is encoded to contain a succession of group code fields each adjoining a control data field, the decoder configured to decode the group code fields to direct placement of each corresponding control data field into control groups within a control word in the one or more memory devices; and
    a set of control circuitry within each of the one or more memory devices, each set of control circuitry coupled to a respective decoder and capable of producing signaling to control reading, erasing, and programming operations.

2. The computer memory system of claim 1, wherein the controller contains a single set of control logic capable of producing the memory control data that is received by each reset circuit and each decoder within the one or more memory devices, the single set of control logic alleviates having an instantiation of control logic within each of the one or more memory devices.

3. The computer memory system of claim 1, wherein the configuration of the reset signal and the mode assertion signal is done on a single line, the mode assertion signal being a variation in the voltage level on the single line between a high logic level and a low logic level and the reset signal being a high voltage reset level on the single line which is greater than a maximum voltage threshold of the high logic level.

4. The computer memory system of claim 1, comprising:
    wherein the reset circuit includes a high voltage reset interface to provide the reset signal, the reset signal including a reset control signal and a reset voltage to the one or more memory devices.

5. The computer memory system of claim 4, wherein the reset control signal and the reset voltage are generated by the controller.

6. The computer memory system of claim 5, wherein the reset voltage is greater than a maximum voltage threshold that represents a high logic value.

7. The computer memory system of claim 6, wherein the reset voltage is at least about 0.7 Volts greater than the maximum voltage threshold that represents the high logic value.

8. The computer memory system of claim 4 including:
    a clock interface to provide a clock signal from the controller to the one or more memory devices.

9. The computer memory system of claim 8, wherein the clock signal presented on the clock interface is generated by the controller.

10. The computer memory system of claim 8, wherein the clock interface is implemented using a single interconnect line.

11. The computer memory system of claim 1, wherein the interface includes an address, data, and command input-output interface, the address, data, and command input-output interface configured to electrically transmit a plurality of signals between the one or more memory devices and the controller, the plurality of signals including address, control, and data signals.

12. The computer memory system of claim 11, wherein data and address information presented on the address, data, and command input-output interface is multiplexed.

13. The computer memory system of claim 11, wherein the address, data, and command input-output interface is implemented using eight interconnect lines.

* * * * *

UNITED STATES PATENT AND TRADEMARK OFFICE
CERTIFICATE OF CORRECTION

PATENT NO.       : 7,971,024 B2
APPLICATION NO.  : 12/351707
DATED            : June 28, 2011
INVENTOR(S)      : Vijay P. Adusumilli It is certified that error appears in the above-identified patent and that said Letters Patent is hereby corrected as shown below:

Column 7, line 52, delete "ca able" and insert -- capable --

Signed and Sealed this
Sixteenth Day of August, 2011

David J. Kappos
*Director of the United States Patent and Trademark Office*